United States Patent [19]

Bydalek

[11] Patent Number: 5,772,377
[45] Date of Patent: Jun. 30, 1998

[54] CAPPED WHEEL FASTENER

[75] Inventor: Theodore J. Bydalek, Buffalo Grove, Ill.

[73] Assignee: MacLean-Fogg Company, Wheeling, Ill.

[21] Appl. No.: 852,896

[22] Filed: May 8, 1997

[51] Int. Cl.$^6$ .............................. F16B 37/14; F16B 43/00
[52] U.S. Cl. .......................... 411/429; 411/375; 411/432
[58] Field of Search ................................. 411/373, 375, 411/429, 430, 431, 432

[56] References Cited

U.S. PATENT DOCUMENTS

| | | | |
|---|---|---|---|
| 272,589 | 2/1883 | Searls | 411/430 |
| 1,254,514 | 1/1918 | Lehmann . | |
| 2,018,301 | 10/1935 | Ferry | 411/430 |
| 3,364,806 | 1/1968 | Chaivre . | |
| 3,561,820 | 2/1971 | Chaivre . | |
| 3,585,900 | 6/1971 | Chaivre . | |
| 3,960,047 | 6/1976 | Liffick . | |
| 3,971,289 | 7/1976 | Chaivre . | |
| 4,015,503 | 4/1977 | Romano . | |
| 4,018,133 | 4/1977 | Chaivre et al. . | |
| 4,056,862 | 11/1977 | Chaivre et al. . | |
| 4,123,961 | 11/1978 | Chaivre et al. . | |
| 4,143,578 | 3/1979 | Becker . | |
| 4,275,285 | 6/1981 | Jadach . | |
| 4,420,848 | 12/1983 | Becker . | |
| 4,427,326 | 1/1984 | Hobson et al. . | |
| 4,460,300 | 7/1984 | Bettini et al. . | |
| 4,472,095 | 9/1984 | Molina . | |
| 4,521,146 | 6/1985 | Wharton . | |
| 4,557,654 | 12/1985 | Masuda et al. . | |
| 4,576,533 | 3/1986 | Chartier . | |
| 4,582,462 | 4/1986 | Thiel . | |
| 4,659,273 | 4/1987 | Dudley . | |
| 4,669,937 | 6/1987 | Feldman . | |
| 4,744,119 | 5/1988 | Omori . | |
| 4,749,321 | 6/1988 | Knohl et al. . | |
| 4,764,070 | 8/1988 | Baltzell et al. . | |
| 4,775,272 | 10/1988 | Toth . | |
| 4,784,555 | 11/1988 | Cantrell . | |
| 4,813,835 | 3/1989 | Toth . | |
| 4,824,305 | 4/1989 | McCauley . | |
| 4,850,776 | 7/1989 | Toth . | |
| 4,883,399 | 11/1989 | MacLean . | |
| 4,955,773 | 9/1990 | Toth . | |
| 4,968,202 | 11/1990 | Lanham . | |
| 4,993,902 | 2/1991 | Hellon . | |
| 5,028,093 | 7/1991 | Nason . | |
| 5,048,898 | 9/1991 | Russell . | |
| 5,082,409 | 1/1992 | Bias . | |
| 5,163,797 | 11/1992 | Lehmann . | |
| 5,180,266 | 1/1993 | Nolan . | |
| 5,302,069 | 4/1994 | Toth et al. . | |
| 5,324,148 | 6/1994 | Notaro . | |
| 5,350,266 | 9/1994 | Espey et al. . | |
| 5,370,486 | 12/1994 | Plummer . | |
| 5,380,070 | 1/1995 | FitzGerald . | |

FOREIGN PATENT DOCUMENTS 633186   1/1928   France .................................. 411/429

*Primary Examiner*—Neill R. Wilson
*Attorney, Agent, or Firm*—Brinks Hofer Gilson & Lione

[57] ABSTRACT

A flanged wheel fastener includes a fastener body having a threaded portion, a load-bearing surface, an out-of-round surface and a flange situated between the load-bearing surface and the out-of-round surface. A cap is disposed over the out-of-round surface and the flange, and an edge portion of the cap is bent around the flange to retain the cap on the fastener body. All portions of the cap are spaced axially away from all portions of the bearing-surface, and the cap is free of welding or adhesive attachment to the fastener body.

13 Claims, 2 Drawing Sheets

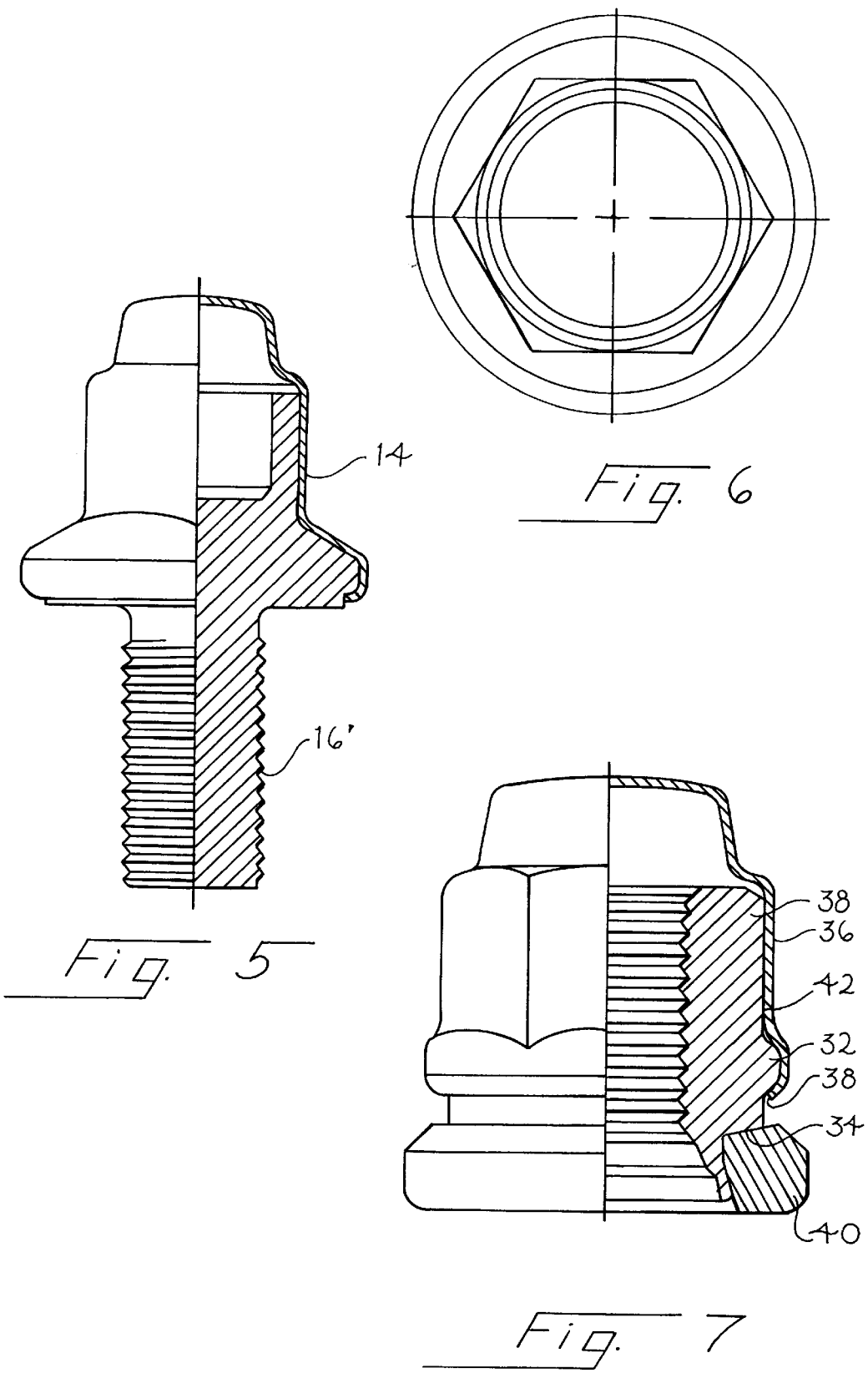

CAPPED WHEEL FASTENER

BACKGROUND OF THE INVENTION

This invention relates to wheel fasteners such as wheel nuts and wheel bolts, and in particular to fasteners of this type including caps.

Wheel nuts have in the past been provided with metal caps for improved ornamental appearance. One commonly used approach is to weld the cap to the body of the wheel nut, as described for example in U.S. Pat. No. 4,056,862.

Another approach is to adhesively secure the cap to the wheel nut, as described in Baltzell U.S. Pat. No. 4,764,070. In the wheel nut shown in the Baltzell patent, the edge of the cap is additionally crimped to the body of the wheel nut, but primary retention of the cap on the body is provided by a silicone adhesive.

A third approach is described in Becker U.S. Pat. No. 4,143,578. In the wheel nut of the Becker patent, the body of the wheel nut is machined in a secondary operation to provide a groove, and the lip of the cap is bent sharply inwardly of the groove to secure the cap in place.

All of these prior art approaches provide certain difficulties. Welding retention may be expensive or cumbersome to implement in automated mass production, because it adds another manufacturing operation. Adhesive retention is only as effective as the adhesive being used. The retention groove of the Becker patent is formed in a secondary machining operation, which entails additional manufacturing cost.

The present invention is directed to an improved capped wheel fastener that reduces or overcomes the disadvantages of the prior art systems described above.

SUMMARY OF THE INVENTION

The present invention is defined in its broadest terms in the independent claims attached to the specification. Without intending any limitation, certain preferred embodiments described below provide a flanged fastener body and a cap which is bent around the flange to retain the cap on the fastener body. The edge of the cap is axially spaced from all portions of the load-bearing surface of the fastener body, and the cap is free of any welding attachment to the fastener body.

BRIEF DESCRIPTION OF THE DRAWINGS

FIG. 5 is a side/cross-sectional view of a third preferred embodiment of this invention.

FIGS. 6 and 7 are top and side/cross-sectional views of a fourth preferred embodiment of this invention, respectively.

DETAILED DESCRIPTION OF THE PRESENTLY PREFERRED EMBODIMENTS

Figure 1:
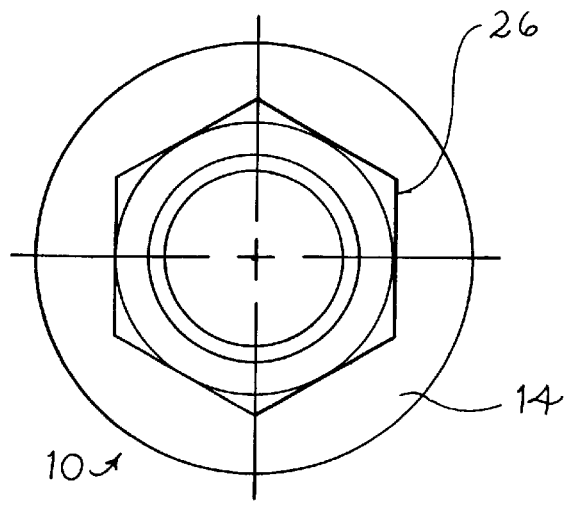
FIGS. 1 and 2 are top and side/cross-sectional views of a first preferred embodiment of this invention, respectively.
Figure 2:
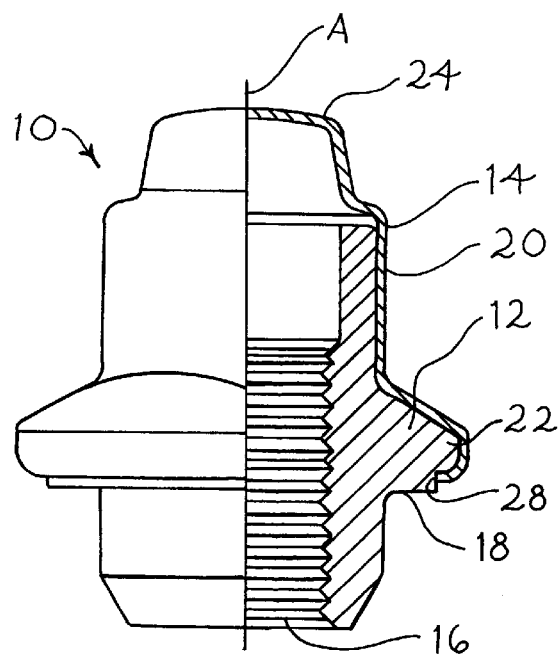

Turning now to the drawings, a wheel fastener 10 is shown in FIGS. 1 and 2. The wheel fastener 10 is in this case a flanged wheel nut comprising a body 12 and a cap 14. The body 12 includes a threaded portion 16 which in this embodiment defines a female thread. The threaded portion 16 is centered about a longitudinal axis A. Extending radially outwardly from the threaded portion 16 is a load-bearing surface 18. In this embodiment the load-bearing surface 18 is oriented perpendicularly to the axis A. The body 14 also defines an out-of-round surface 20 which in this embodiment is hexagonal in shape, and which defines a set of six wrench flats designed to accept torque from a tool such a lug-wrench. A flange 22 extends radially outwardly from the out-of-round surface 20, and the load-bearing surface 18 extends outwardly from the threaded portion 16, on the lower portion of the flange 22.

As shown in FIG. 2, the cap 14 is shaped generally to conform to the out-of-round surface 20 and the flange 22. Thus, the cap 14 also defines six wrench flats 26 arranged in a hexagonal pattern, as shown in FIG. 1.

The open end of the cap 14 defines a free edge 28 best shown in FIG. 2. This edge 28 is bent around the flange 22 and in particular around a circularly symmetrical portion of the flange 22 at the radially outer-most portion of the flange 22. As shown in FIG. 2, the edge 28 of the cap 14 (and in fact all portions of the cap 14) are axially spaced away from the load-bearing surface 18. Thus, forces exerted on the load-bearing surface 18 cannot act to dislodge the cap 14.

It has been found that the bent portion adjacent the edge 28 provides excellent retention of the cap 14, without any welding attachment or any adhesive attachment between the cap 14 and the body 12. If desired, a suitable adhesive may be interposed between the cap 14 and the body 12 to provide a water seal, and to reduce rattles. In this embodiment it is the bent portion of the cap 14 adjacent the edge 28 that provides the majority of the retaining forces tending to hold the cap 14 in place on the body 12.

In order to provide adequate retention forces it is preferred that the edge portion of the cap 14 adjacent the edge 28 be oriented within ±45 degrees of a plane perpendicular to the axis A. In the embodiment shown in FIGS. 1 and 2 this edge portion of the cap 14 is oriented substantially perpendicular to the axis A.

Figure 3:
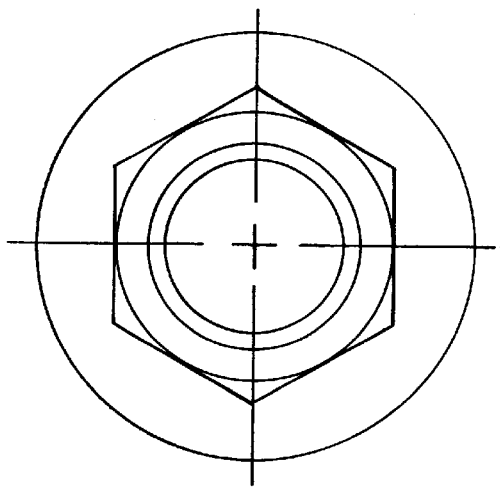
FIGS. 3 and 4 are top and side/cross-sectional views of a second preferred embodiment of this invention, respectively.
Figure 4:
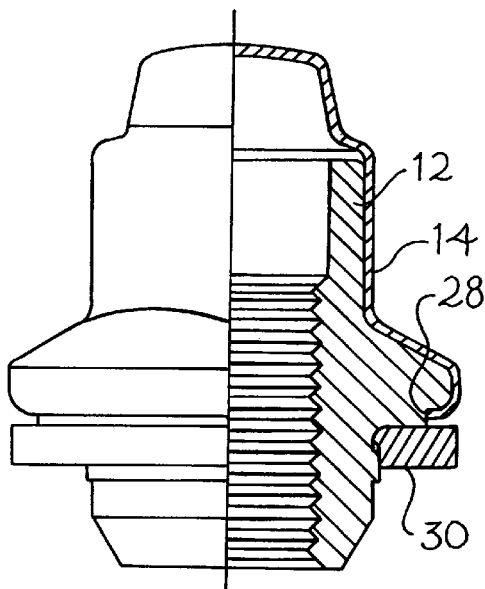

FIGS. 3 and 4 show a second preferred embodiment of a wheel fastener which incorporates the present invention. Corresponding reference numerals are used for corresponding elements of the first and second embodiments. In this embodiment a washer 30 is captured in place on the body 12 adjacent the load-bearing surface 18. As before, the cap 14 is held in place on the body 12 by the bent portion of the cap 14 adjacent the edge 28.

FIG. 5 relates to a third preferred embodiment which is in many ways similar to the first embodiment described above. However, in this case the illustrated fastener is a wheel bolt, not a wheel nut, and the threaded portion 16' defines a male thread rather than a female thread. The cap 14 is retained in place in the same manner as in the embodiment of FIGS. 1 and 2.

FIGS. 6 and 7 relate to another preferred embodiment which in this case does not include a flange. Instead, an annular ridge 32 is cold formed on a wheel nut body 38 intermediate a load bearing surface 34 and an out-of-round surface 42. In this case a bent portion of a cap 36 adjacent to an edge 38 is deformed over the ridge 32 to retain the cap 36 in place on the body 38. A washer 40 is positioned to bear on the load-bearing surface 34.

In all of the embodiments described above, the body of the fastener is cold formed with all required edges and surfaces, and no secondary machining operations are required to provide surfaces for engagement of the cap. In this way, the advantages of a crimped-in-place cap are obtained, while avoiding the disadvantages of secondary machining operations.

The present invention can be adapted for use with a wide variety of wheel fasteners, and a wide variety of materials can be used. For example, and without intending any limitation, the fastener body may be cold formed of a metal such as a low or medium carbon steel, and the cap may be made of a sheet metal such as stainless steel having a thickness of 0.5 mm. The cap may also be formed of a low or medium carbon steel, a suitable plastic or other materials.

It should be understood that the foregoing detailed description describes only a few of the many forms that the present invention can take. For this reason, it is intended that this description be regarded as illustrative rather than limiting. It is only the following claims, including all equivalents, that are intended to define the scope of this invention.

I claim:

1. A flanged wheel fastener comprising:

a fastener body comprising a threaded portion, flange extending outwardly from the threaded portion, an out-of-round surface adapted to receive torques from a wrench, and a load-bearing surface formed on the flange, said flange extending radially outwardly from the out-of-round surface, said out-of-round surface and said load-bearing surface positioned on opposite sides of said flange; and a cap disposed over the out-of-round surface and the flange, wherein the cap comprises an edge, wherein a portion of said cap adjacent said edge is bent around the flange to retain the cap on the fastener body, and wherein said edge is axially spaced away from all portions of the load-bearing surface;

said cap being free of welding attachment to the fastener body.

2. A wheel fastener comprising:

a fastener body comprising a threaded portion, a load-bearing surface situated outwardly from the threaded portion, an out-of-round surface adapted to receive torques from a wrench, and an annular ridge extending around the fastener body intermediate the out-of-round surface and the load-bearing surface;

a cap disposed over the out-of-round surface and the ridge, wherein the cap comprises an edge, wherein a portion of the cap adjacent the edge is bent around the ridge to retain the cap on the fastener body, and wherein said edge is axially spaced away from all portions of the load-bearing surface;

said cap being free of welding attachment to the fastener body.

3. The invention of claim 1 or 2 wherein the threaded portion is centered on a longitudinal axis, and wherein the portion of the cap immediately adjacent the edge is oriented at an angle within 45° of a plane perpendicular to said axis.

4. The invention of claim 3 wherein the portion of the cap immediately adjacent the edge is substantially parallel to said plane perpendicular to the axis.

5. The invention of claim 1 or 2 wherein the portion of the cap that is bent around the flange provides a majority of all retention forces for the cap on the fastener body.

6. The invention of claim 1 or 2 wherein the cap is free of adhesive attachment to the fastener body.

7. The invention of claim 1 or 2 wherein the threaded portion comprises a female thread, and wherein the wheel fastener comprises a wheel nut.

8. The invention of claim 1 or 2 wherein the threaded portion is centered on a longitudinal axis, and wherein the load-bearing surface is substantially perpendicular to the axis.

9. The invention of claim 8 further comprising a washer mounted to the fastener body adjacent the load-bearing surface.

10. The invention of claim 1 wherein the threaded portion comprises a male thread, and wherein the wheel fastener comprises a wheel bolt.

11. The invention of claim 1 wherein the cap is circularly symmetrical adjacent a radially outer portion of the flange.

12. The invention of claim 2 wherein the portion of the cap that is bent around the ridge provides a majority of all retention forces for the cap on the fastener body.

13. The invention of claim 2 wherein the cap is circularly symmetrical adjacent a radially outer portion of the ridge.

* * * * *